(12) United States Patent
Karasaki et al.

(10) Patent No.: US 6,782,012 B2
(45) Date of Patent: Aug. 24, 2004

(54) LASER DEVICE AND METHOD OF CONTROLLING Q-SWITCHED FREQUENCY CONVERTED LASER, PROCESS AND SYSTEM USING LASER DEVICE

(75) Inventors: Hidehiko Karasaki, Ashiya (JP); Katsuichi Ukita, Minou (JP)

(73) Assignee: Matsushita Electric Industrial Co., Ltd. (JP)

( * ) Notice: Subject to any disclaimer, the term of this patent is extended or adjusted under 35 U.S.C. 154(b) by 1 day.

(21) Appl. No.: 09/873,416

(22) Filed: Jun. 5, 2001

(65) Prior Publication Data

US 2002/0018495 A1 Feb. 14, 2002

(30) Foreign Application Priority Data

Jun. 6, 2000 (JP) ........................................ 2000-168538

(51) Int. Cl.[7] .................................................. H01S 3/11
(52) U.S. Cl. .............................. 372/10; 372/25; 372/30; 372/22
(58) Field of Search .............................. 372/10, 12, 13, 372/14, 22, 25, 30

(56) References Cited

U.S. PATENT DOCUMENTS

| | | | |
|---|---|---|---|
| 3,747,019 A | | 7/1973 | Koechner et al. .......... 331/94.5 |
| 4,930,901 A | * | 6/1990 | Johnson et al. ................ 372/10 |
| 6,009,110 A | * | 12/1999 | Wiechmann et al. ......... 372/10 |
| 6,108,356 A | * | 8/2000 | Yin ............................. 359/329 |
| 6,339,604 B1 | * | 1/2002 | Smart .......................... 372/108 |

FOREIGN PATENT DOCUMENTS

| | | |
|---|---|---|
| JP | 2-260479 | 10/1990 |
| JP | 4-351281 | 12/1992 |
| JP | 5-323394 | 12/1993 |
| JP | 11-224968 | 8/1999 |

* cited by examiner

Primary Examiner—Jerome Jackson
Assistant Examiner—Matthew Landau
(74) Attorney, Agent, or Firm—Parkhurst & Wendel, L.L.P.

(57) ABSTRACT

A harmonic Q switch laser device and its control method for obtaining a stable laser pulse while protecting a nonlinear optical crystal used for a wavelength conversion are presented. In this laser device, in a pause period of a laser train, a Q switch which is turned on makes the laser oscillates spuriously and continuously, and prevents a gain from accumulating in a gain medium Before a generation of a laser pulse, the Q switch is turned off for a specified period to raise the laser gain, so that a pulse of a specified magnitude is generated from the first shot when turning on the Q switch.

42 Claims, 13 Drawing Sheets

LASER DEVICE AND METHOD OF CONTROLLING Q-SWITCHED FREQUENCY CONVERTED LASER, PROCESS AND SYSTEM USING LASER DEVICE

FIELD OF THE INVENTION

The present invention relates to a laser device with a Q switch for generating a higher harmonics, a method of controlling the device, and a laser processing machine comprising the device.

BACKGROUND OF THE INVENTION

A conventional Q switch laser device will be explained. FIG. 7 shows a configuration of a conventional a harmonic-generating Q switch laser device. The device comprises a laser head 11, a Q switch 12, an excitation light source 13, a radio frequency (RF) driver 14 for the Q switch, a controller 15, an interface 16, a power source 17, and an operation unit 18.

The operation of the device will be explained with referring to FIG. 7. An oscillation condition instruction set through the operation unit 18 such as a personal computer (PC) is sent to the control circuit 15 through the interface 16. The controller 15 interprets the transmitted oscillation condition instruction, generates a control signal according to the instruction, transmits the condition to the excitation light source 13 and RF driver 14 for the Q switch, and determines the oscillation condition of the laser head. At the same time, the controller 15 also controls the alarm from the laser head 11 and a temperature of a nonlinear optical crystal.

An optical operation of the harmonic-generating Q switch laser

An optical operation of the harmonic-generating Q switch laser device will be explained with referring to FIG. 13. FIG. 13 shows an internal structure of the laser head 11 of the harmonic-generating Q switch laser device shown in FIG. 7. The head 11 comprises a reflecting mirror 21, a Q switch element 42, a gain medium 23, an output mirror 24, a condenser lens 25, a nonlinear optical crystal 26, an optical lens 27, a narrow band filter or dichroic mirror 28, and two lenses 25 and 27. The lenses 25, 27 function as a collimator. The device where the nonlinear optical crystal 26 is disposed outside of the mirrors 21, 24 is called an extra cavity system.

The optical operation of this harmonic-generating Q switch laser head will be explained with referring to FIG. 13. When an excitation light enters the gain medium 23, an optical resonation occurs between the reflector mirror 21 and output mirror 24. In this case, when the Q switch element 42 inserted between the mirrors 21 and 24 is turned on, the optical path opens, and the laser oscillates. When the element is turned off, the optical path closes, and the oscillation stops. Thus, a pulse laser oscillation is enabled. The Q switch element 42 is turned on and off by the RF driver 14 for the Q switch, and enables the Q switch laser head to pulse-oscillate. The laser light issued from the output mirror 24 is condensed by the condenser lens 25, and emitted to the nonlinear optical crystal 26. A harmonic laser is generated by the nonlinear optical crystal 26, is collimated by the optical lens 27, and is separated into an IR laser, a fundamental wave and harmonic laser by the narrow band filter or dichroic mirror 28. The harmonic laser is used for a processing machine.

For example, the power $P_{SHG}$ of a harmonic laser of second harmonic generation (SHG) is expressed in the following formula.

$$P_{SHG} = d_{eff} \cdot l_{eff} \cdot (P_{IR})^2 / A$$

where $d_{eff}$ is a nonlinear constant, a constant determined by the type of the nonlinear optical crystal 26, the larger constant, a higher conversion efficiency; $l_{eff}$ is an effective length, a length in which the nonlinear optical crystal 26 has a nonlinear effect; $P_{IR}$ is the power of the fundamental wave; and A is a laser beam area.

Under this relationship, reducing the beam area A and reinforcing the fundamental wave power $P_{IR}$ into the nonlinear optical crystal 26 increases the harmonic laser output. In order to increase the power, the beam put into the nonlinear optical crystal 26 is condensed.

However, the nonlinear optical crystal 26 has a limited light strength, i.e., the crystal is broken when a light exceeding a damage threshold is input. Even if the light is not reaching the damage threshold, a light approaching the damage threshold affects a life of the nonlinear optical crystal 26.

The optical characteristic of the harmonic-generating Q switch laser and a breakdown of the nonlinear optical crystal will be explained with referring to FIG. 9. FIG. 9 shows the oscillation characteristic of the Q switch laser. In a simplest method of operating the Q switch laser device, an arc current of a lamp or current of a laser diode (LD) is maintained in constant, and accordingly, the excitation light power is kept constant, and the Q switch is turned on and off. However, since the excitation light enters the gain medium 23 for a long period while the Q switch closes before an oscillation is started, a gain accumulated in the gain medium 23 excesses a specified value. Therefore, when a gate signal for starting an oscillation is turned on, a giant pulse is generated at a first shot or several shots depending on cases. This giant pulse may destroy the nonlinear optical crystal 26 or shorten the life of the crystal.

To avoid generating such a giant pulse, the controller of the Q switch laser device may have a first pulse suppression (FPS) function.

Referring to FIG. 10, the FPS function of the Q switch laser device will be explained. In order to suppress the giant pulse in the first shot or several shots when the gate signal is turned on upon starting the oscillation, the excitation light into the gain medium 23 is weakened to such an extent as to maintain a specified gain while the Q switch is closed for a long time.

In this method, the laser gain accumulated in the gain medium 23 is prevented from getting excessive. Since the maximum excitation light power is limited, the gradient of building-up the laser gain is limited. The period until the specified laser gain is accumulated depends on the interval of the pulse train following the first pulse, that is, a pulse frequency. Therefore, whenever the pulse frequency changes, the condition of the FPS function such as the laser gain retention current $\Delta I$ and retention period $\Delta T$ must be adjusted.

In other method of realizing the FPS function, the rise time of the Q switch may be delayed, but it is similarly needed to set the condition of the FPS function for each pulse frequency.

FIG. 11 shows an optical system of a laser processing machine having the harmonic-generating Q switch laser device. The processing machine comprises a harmonic-generating Q switch laser device 31, a collimator lens 32, a mask changer 33, a bend mirror 34, a galvanoscanner 35, a scanner lens 36, and a working table 37.

The laser emitted from the harmonic-generating Q switch laser device 31 have the beam diameter optimized by the collimator 32, and is emitted to the mask on the mask changer 33. A portion of the emitted laser passes through the mask, and is condensed at a specified position through the scanner lens 36 by the galvanoscanner 35 through the bend mirror 34, and processes the work fixed on the table 37.

While processing the work, generally, a pulse train of a specified frequency is needed, a long pause period is necessary in order to convey the work, and the pulse oscillation and pause period are repeated.

FIG. 12 shows an output characteristic of the harmonic-generating Q switch laser device. A low pulse frequency increases the pulse energy, and increases a possibility of damaging the nonlinear optical crystal 26 or shortening of the life of the crystal.

Therefore, a long pause period longer in order to convey the work makes the gain be accumulated excessively in the gain medium 23, and generates the giant pulse, which damages the nonlinear optical crystal 26 or shorten the life of the crystal, and thereby reduces the reliability.

To avoid such circumstances, the harmonic-generating Q switch laser device 31 generally incorporated in the laser processing machine has the FPS function as mentioned above.

Particularly a fine processing, the pulse frequency is required to change on the way. In this case, the FPS function is suspended, or even if the FPS function is employed for safety, the period for sending the condition setting instruction of the FPS function is required, and makes an entire processing time longer.

Besides, an unstable pulse processes the work uniformly.

Emitting the giant pulse or first pulse to a dummy target other than the work. the galvanoscanner 35 installed in the processing machine. may eliminates an affect of the pulse to the work. That, however, does not protect the nonlinear optical crystal 26, and the reliability of the device is still not improved.

SUMMARY OF THE INVENTION

A laser device and a method of controlling the device are provided for protecting a nonlinear optical crystal without a loss of a cycle time, and for assuring a reliability of a laser processing machine. And a laser processing machine having the device and a processing method using the machine are provided.

The laser device generates a laser pulse train formed of a sequence of laser pulses. The laser device comprises an output mirror, a reflector mirror, a gain medium disposed between the output mirror and reflector mirror for accumulating the laser gain, a Q switch disposed between the output mirror and the reflector mirror for turning on and off a laser oscillation by the output mirror, reflector mirror and gain medium, a nonlinear optical crystal for generating a harmonic laser by recieving a fundamental wave laser by the laser oscillation. During a first pause period before the laser pulse train, the laser oscillation is turned on by the Q switch, and during a second pause period before each laser pulse, the laser oscillation is turned off by the Q switch.

DESCRIPTION OF THE PREFERRED EMBODIMENTS (First Exemplary Embodiment)

Figure 8:
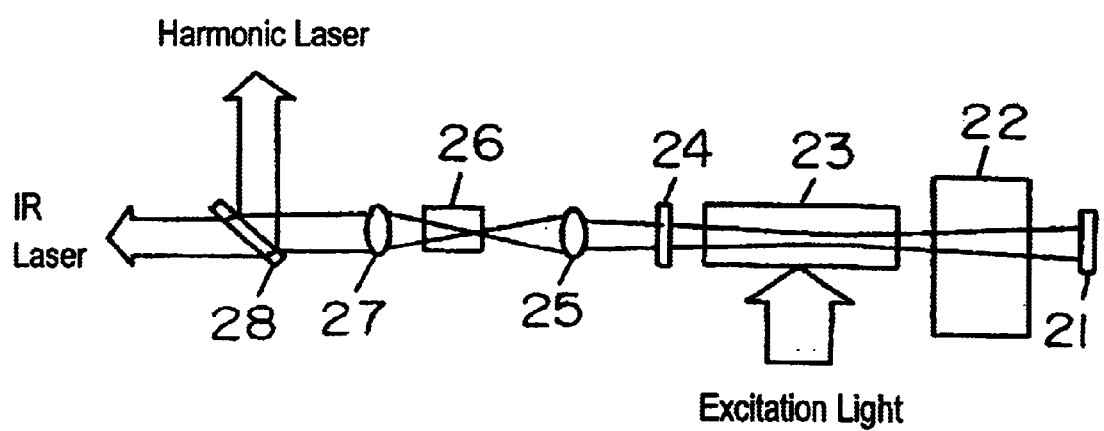
FIG. 8 shows a configuration of a laser head of the harmonic-generating Q switch laser device according to the first embodiment.
Figure 9:
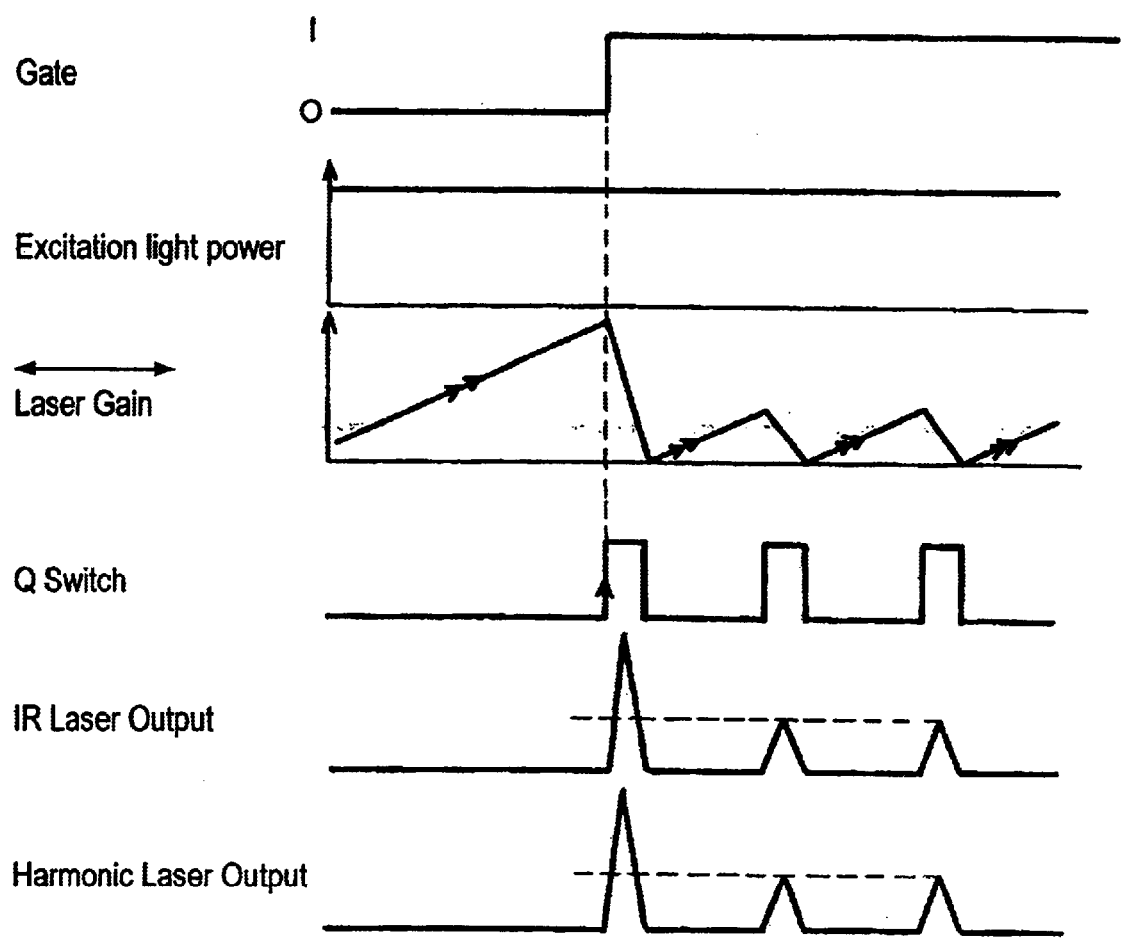
FIG. 9 shows a control of a conventional harmonic-generating Q switch laser oscillator.
Figure 10:
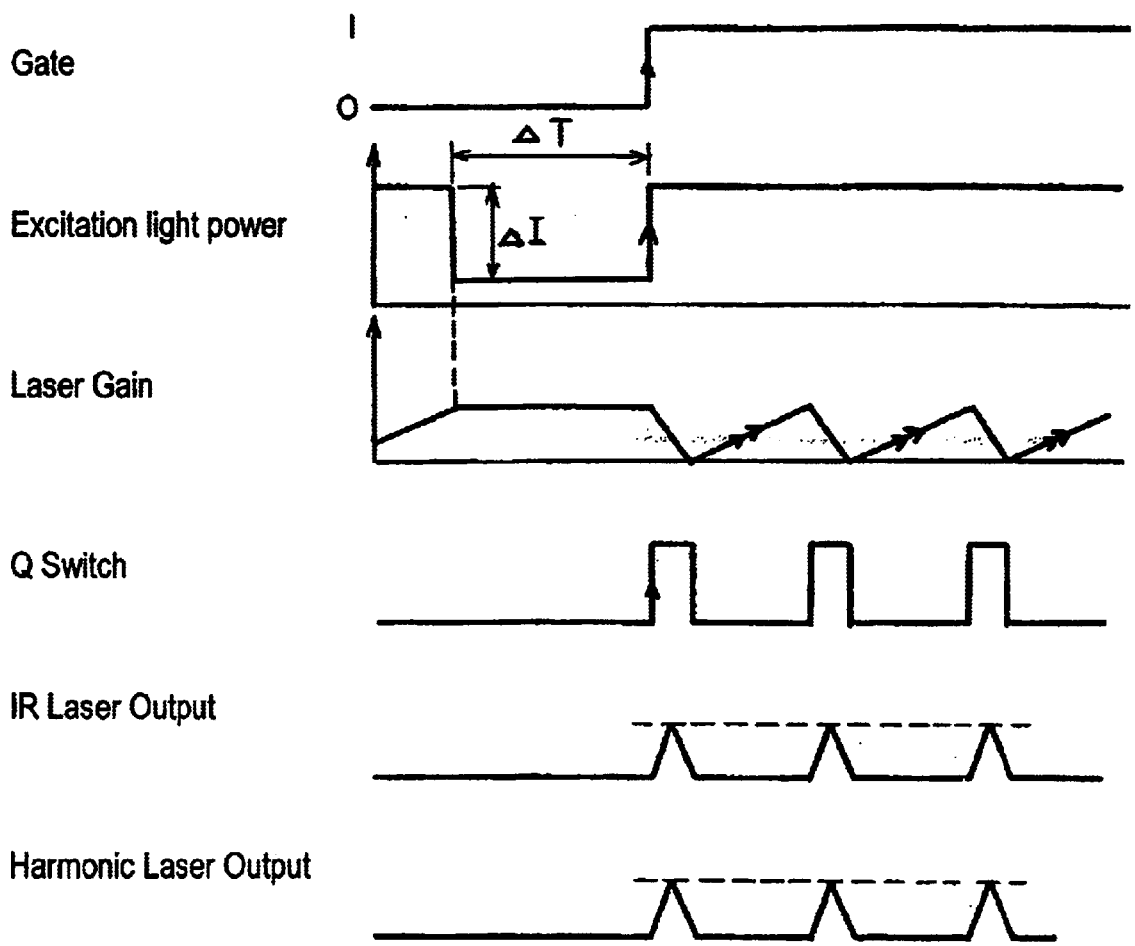
FIG. 10 shows a control of a conventional harmonic-generating Q switch laser oscillator.
Figure 11:
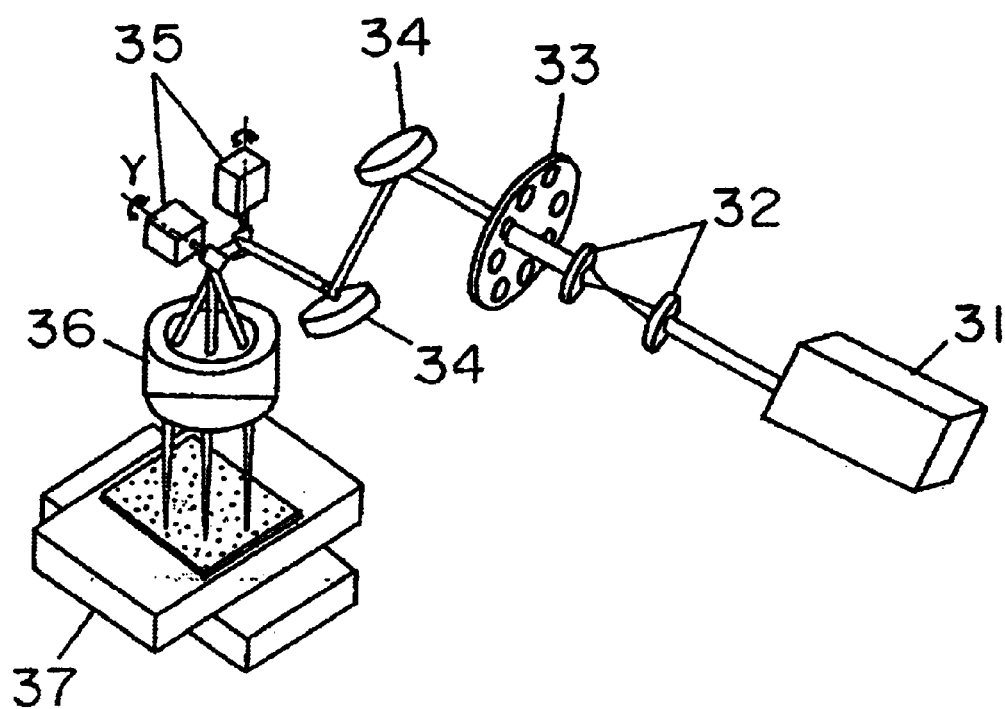
FIG. 11 shows a laser processing machine using a harmonic-generating Q switch laser device.
Figure 12:
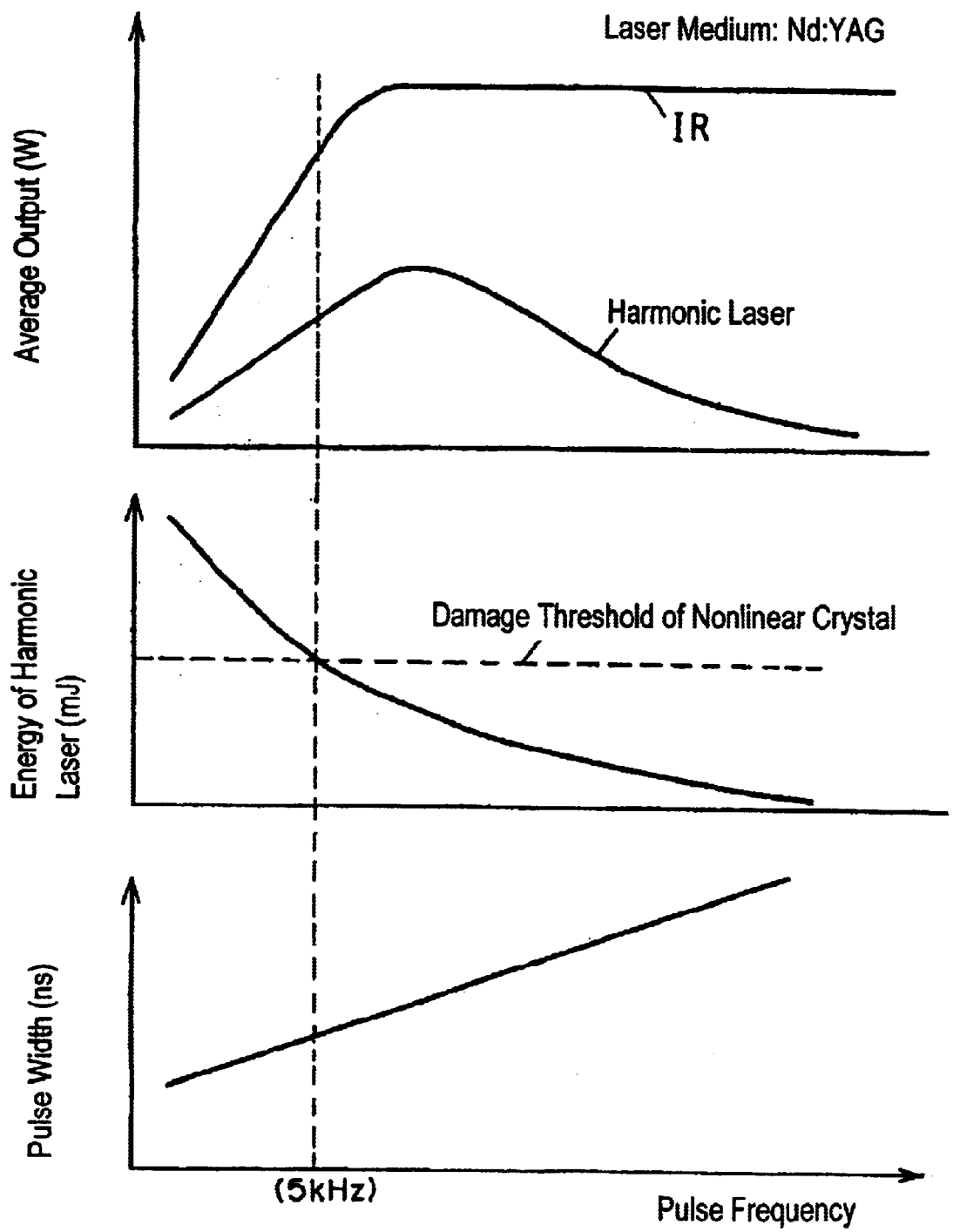
FIG. 12 shows an output characteristic of a conventional harmonic-generating Q switch laser device.
Figure 13:
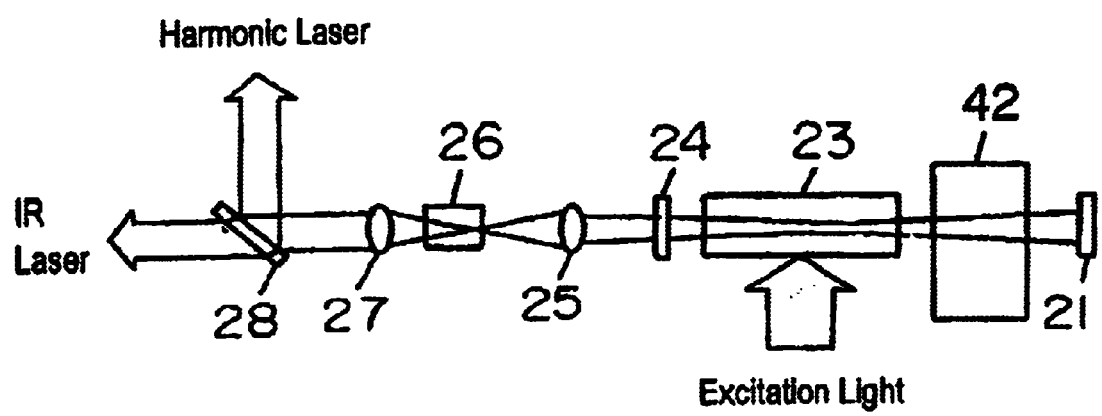
FIG. 13 shows the conventional harmonic-generating Q switch laser device.

The operation of a laser device according to a first exemplary embodiment of the present invention will be explained with referring to FIG. 1. The harmonic-generating Q switch laser device according to the first embodiment is same as shown in FIG. 8, and a control of the device will be explained.

In this device, an arc current of a lamp emitting excitation light or a current of a laser diode (LD) is maintained in constant, and the excitation light power is kept constant, and the Q switch is turned on and off to control a laser oscillation.

Figure 1:
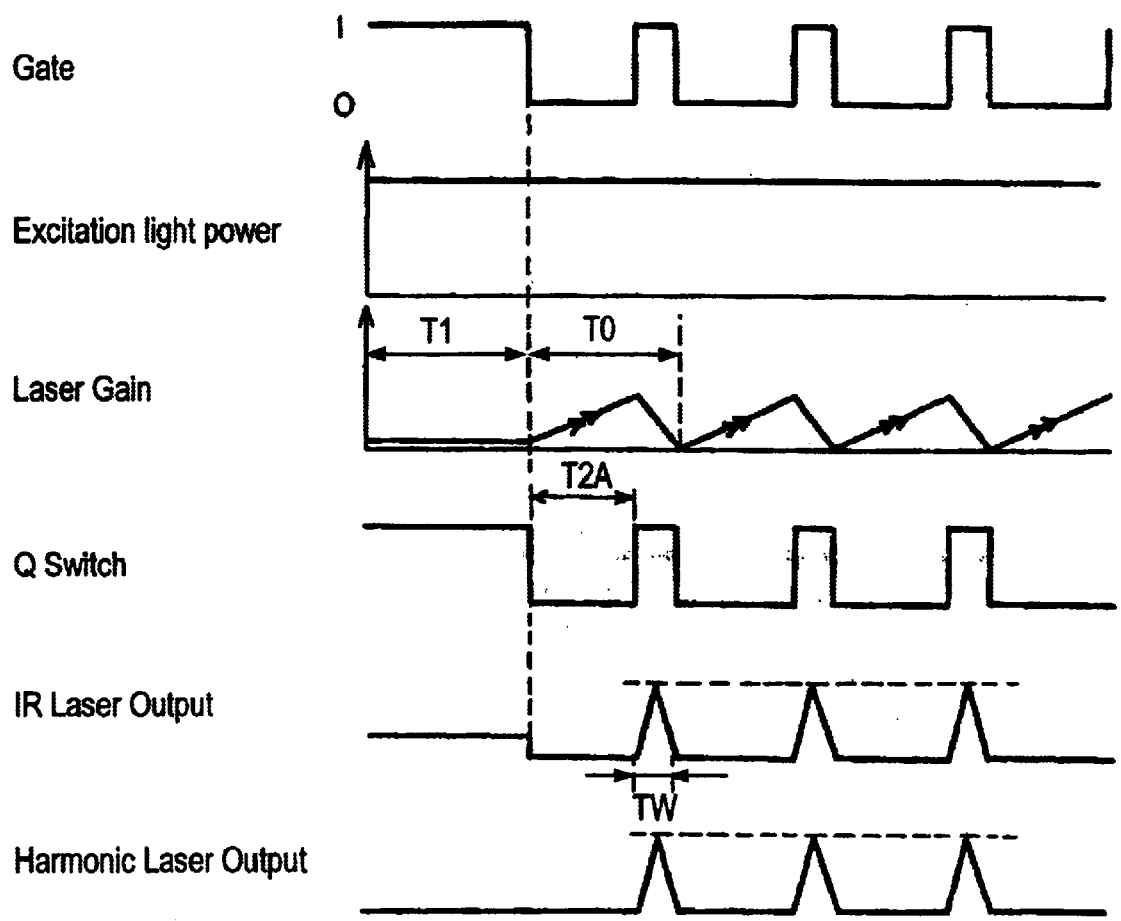
FIG. 1 is a diagram for explaining an operation of a Q switch laser device according to a first exemplary embodiment of the present invention.

As shown in FIG. 1, during a first pause period T1 before an oscillation of a harmonic laser, the Q switch which is turned on sets the device to a continuous oscillation mode for oscillating the laser continuously. During a specified second pause period T2A before a harmonic laser pulse is generated, the Q switch which is turned off makes a laser power be accumulated in the laser medium irradiated with an excitation light. The second pause period T2A is equal to a duration determined through extracting a pulse width TW from a pulse period T0 of the laser pulse train (T2A=T0−TW). The pulse width TW is so small to be negligible for the pulse period T0, and hence the pause period T2A substantially coincides nearly with the pulse period T0.

The second pause period T2A is equal to the duration of a pulse period T0 of the laser pulse train extracted by a pulse width TV, i.e., T2A=T0−TW. In other words, the second pause period T2A is equal to a duration determined through extracting a pulse width TW from a pulse period T0 of the laser pulse train.

By turning on the Q switch 22 during the first pause period T1 before the oscillation of the harmonic laser to set the device to the continuous oscillation mode, a laser gain is prevented from being accumulated in the gain medium. A specified second pause period T2A nearly coinciding with the pulse period T0 of the pulse train which is preset before a generation of the pulse makes the laser gain before the oscillation of the harmonic pulse be always kept at a specified value.

Figure 6:
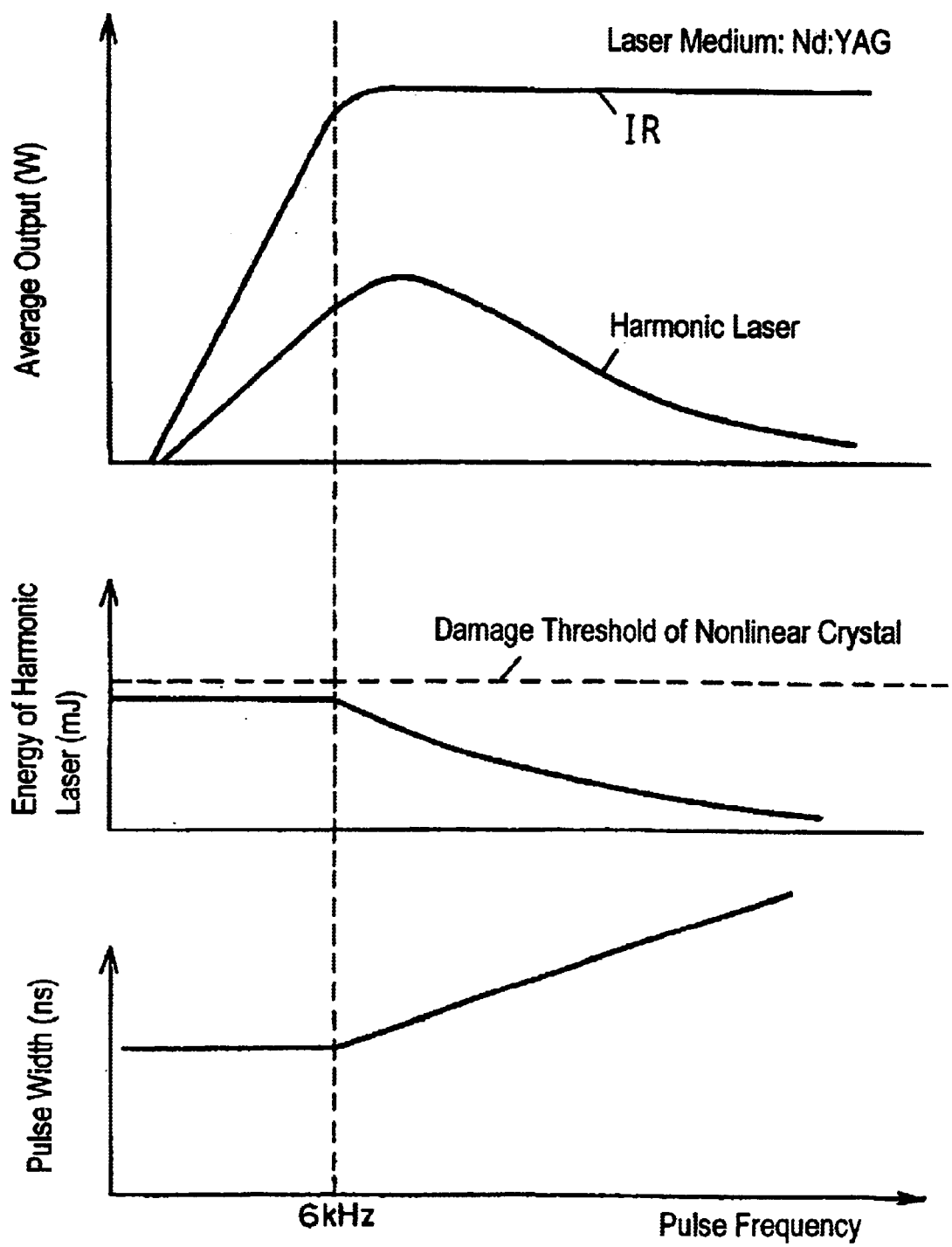
FIG. 6 shows an output characteristic of harmonic generating Q switch laser device according to the embodiment.
Figure 7:
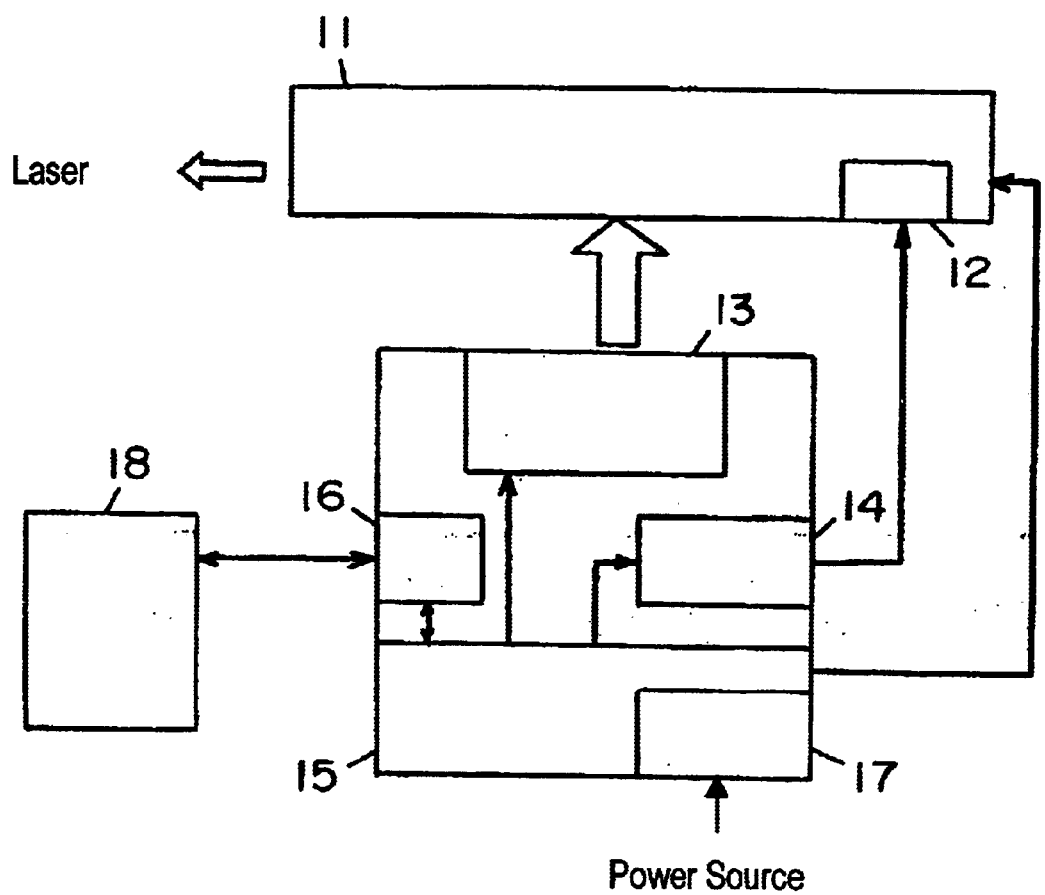
FIG. 7 shows a configuration of the harmonic-generating Q switch laser device.

FIG. 6 shows a laser output characteristic of the laser device according to the embodiment. As clear from the diagram, the pulse energy at a low frequency where the second pause period T2A is long is prevented from rising excessively, and the nonlinear optical crystal is protected owing to the characteristic. This control, therefore, makes a harmonic pulse be oscillated stably, and eliminates a damage or a shortening of life of the nonlinear optical crystal. Further, the control prevents a giant pulse from being generated without the FPS function.

In the laser processing machine having such a laser device, a stable harmonic pulse is obtained even if the pulse train is generated randomly. The stable pulse improves the quality of the laser processing and generates no loss time even when the pulse oscillation condition changes, so that a laser processing machine of high productivity may be provided.

Moreover, a constant arc current of a lamp emitting excitation light or a current of an LD laser effectively prevents the life of the lamp or the LD from being shortened due to a heat cycle and fluctuations.

Figure 5:
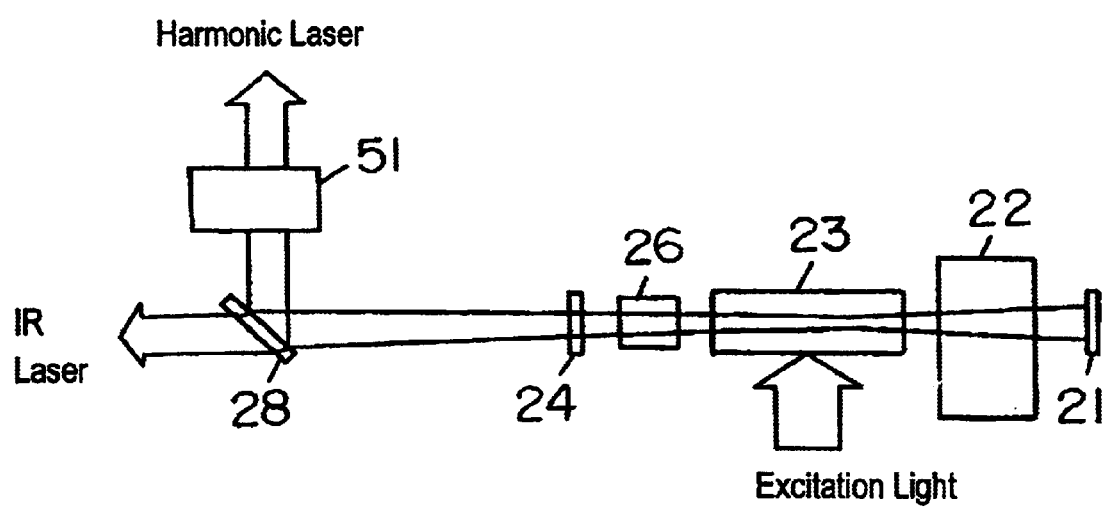
FIG. 5 shows a configuration of a laser head of a harmonic-generating Q switch laser device according to the embodiments.

A harmonic-generating Q switch laser device of an intra cavity system according to the first embodiment is shown in FIG. 5. The nonlinear optical crystal 26 is positioned differently from the device shown in FIG. 8, and is located between the mirrors 21 and 24, and hence it is called the intra cavity system. This device includes a harmonic dispensing device 51 like an optical modulator such as an acousto-optical modulator (AOM). Other components are the same as in the extra cavity system shown in FIG. 8 although the order is different.

Figure 2:
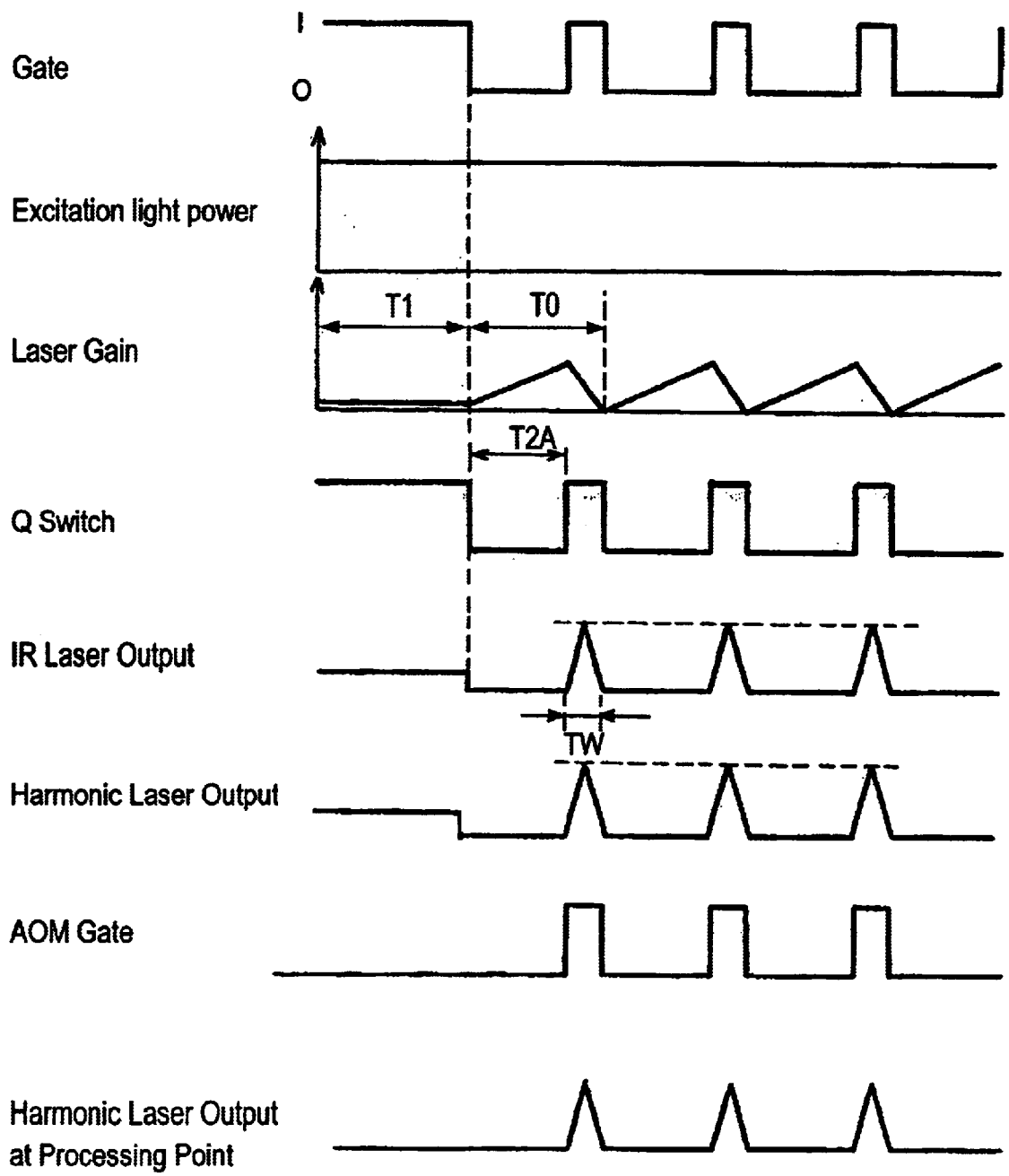
FIG. 2 is a diagram for explaining an operation of other Q switch laser device according to the first embodiment.

The nonlinear optical crystal 26 generates higher harmonics while the incident beam diameter is wide. Therefore, a weak harmonic laser may be issued with an output infrared ray (IR) during the first pause period T1 of the laser pulse, i.e., a continuous wave (CW) of a fundamental wave laser. This device installed in the laser processing machine may generate the weak harmonic laser exceeding a processing threshold. The harmonic pulse is dispensed for extracting only harmonic pulse as shown in FIG. 2 by the harmonic dispensing device 51 to which a dispensing signal is input. The device 51 is disposed in the harmonic output path as shown in FIG. 5. As a result, the laser device of the intra cavity system has the same effect as the extra cavity system.

(Second Exemplary Embodiment)

Figure 3:
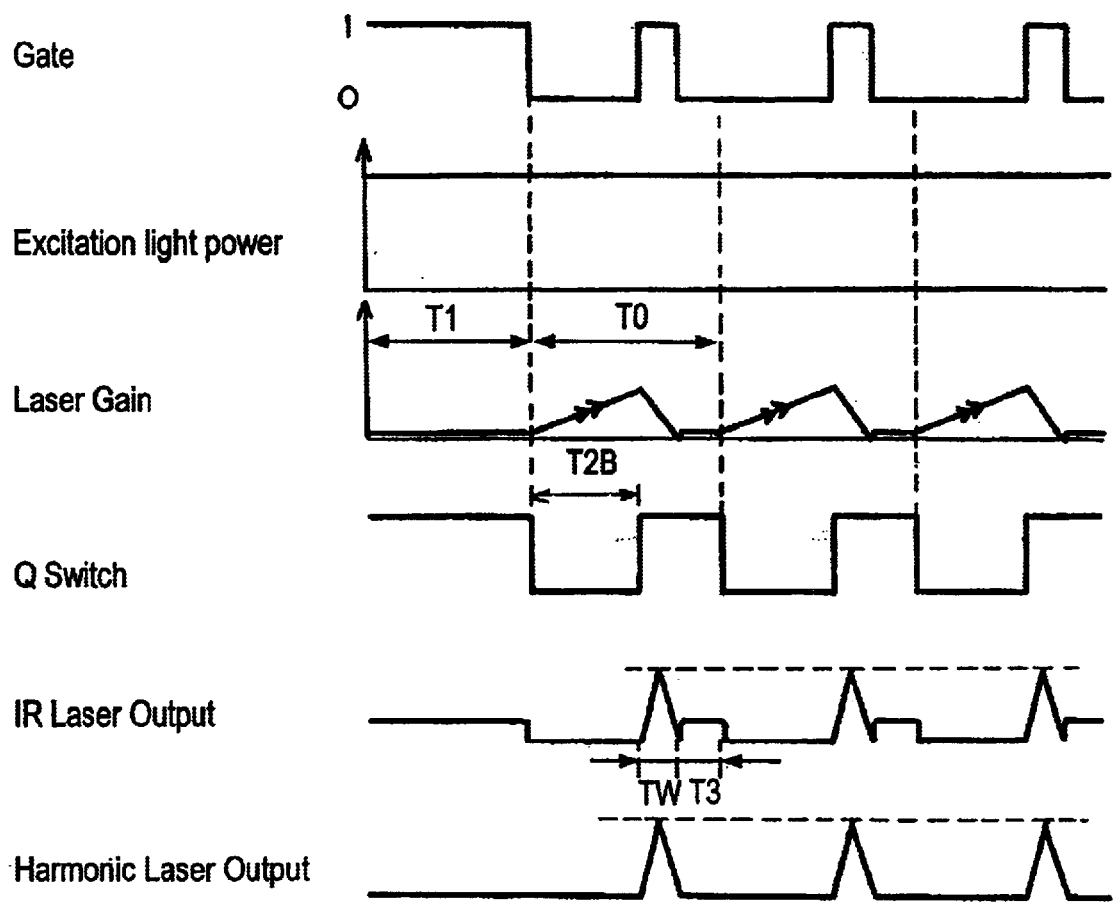
FIG. 3 is a diagram for explaining an operation of a Q switch laser device according to a second exemplary embodiment of the present invention.

An operation of a laser device according to a second exemplary embodiment of the present invention will be explained with referring to FIG. 3. The configuration of a harmonic-generating Q switch laser device according to the second embodiment is the same as shown in FIG. 8.

The gain medium 23 of this device receives an excitation light having a constant power as the same as in the first embodiment. During a first pause period T1 before an oscillation of a harmonic laser, the Q switch 22 which is turned on sets the device to a continuous oscillation mode. During a specified second pause period T2B before a generation of the harmonic laser pulse, the Q switch 22 which is turned off makes more gain accumulate in the gain medium 23 by the excitation light. The pause period T2B is shorter than the pulse period T0 of pulse train. During the pause period T2B, the gain accumulated in the medium 23 is controlled, and the pulse output is thus controlled.

The Q switch 22 which is turned on during the first pause period T1 before the oscillation of the harmonic laser sets the device to the continuous oscillation mode, and prevents the laser gain for excessively accumulating in the gain medium. The pause period T2B, which is shorter than the pulse period, controls the laser gain before the oscillation of the harmonic pulse stably.

FIG. 6 shows a laser output characteristic according to the embodiments. As clear from the diagram, the pulse energy at low frequency, where the second pause period T2B is long, is prevented from rising excessively, and the nonlinear optical crystal is protected from damage or shortening of life owing to this characteristic. The shorter the pause period TB2, the much smaller the pulse energy, and the nonlinear optical crystal is protected more securely. Therefore, the harmonic pulse always oscillates stably, and the laser output is controlled by the pause period T2B. Besides, without the FPS function, the giant pulse is not generated.

In the laser processing machine having such laser device, not only a stable harmonic pulse is obtained even if the pulse train is generated randomly, but also the laser output can be controlled precisely through the pause period control, so that a laser processing quality may be excellent. Further, a loss time does not occur even when the pulse oscillation condition changes, so that a high productivity may be presented.

Moreover, a constant arc current of the lamp emitting an excitation light or a current of an LD effectively prevents the life of the lamp or LD from being shortened due to fluctuations.

Figure 4:
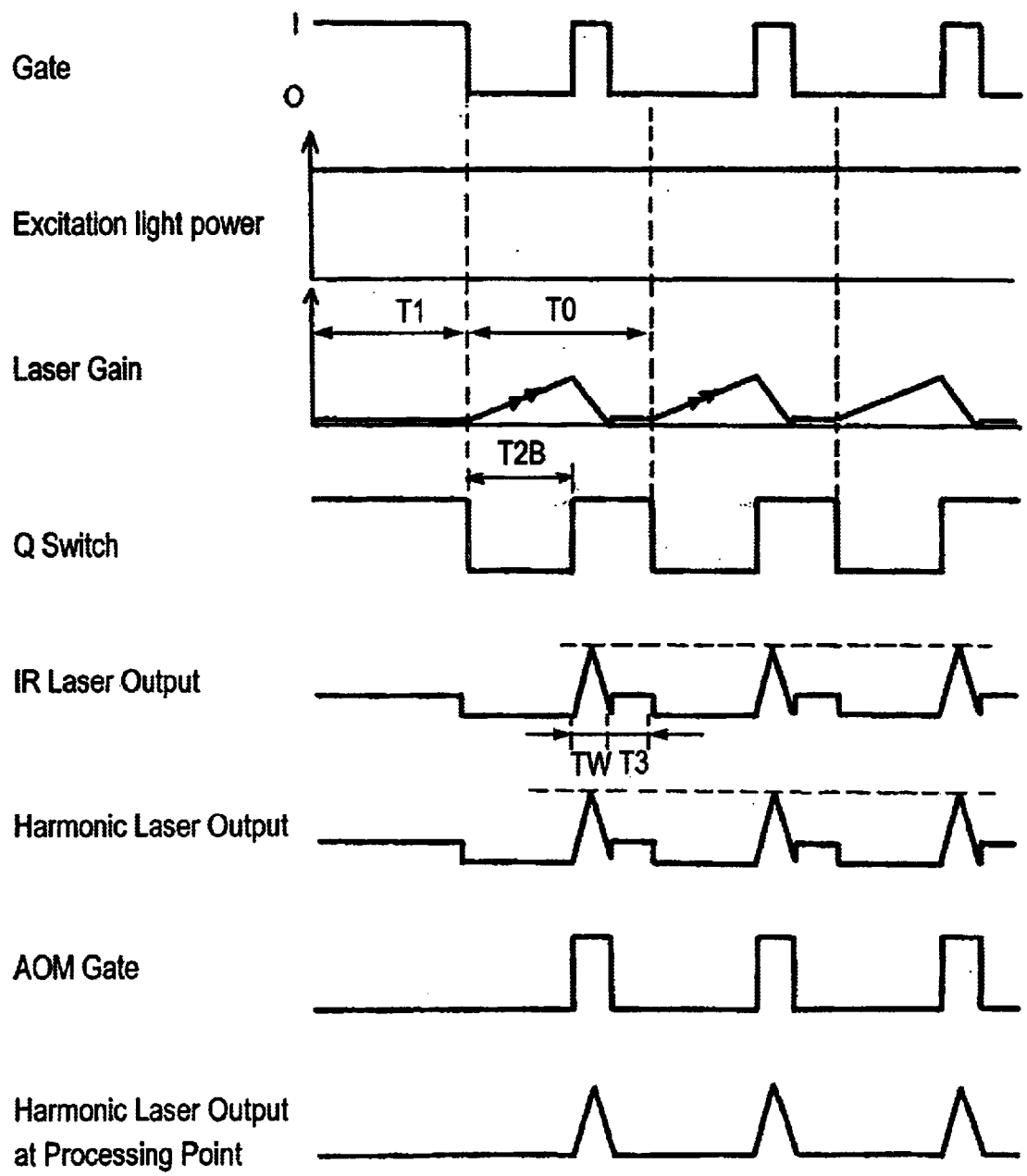
FIG. 4 is a diagram for explaining an the operation of other Q switch laser device according to the second embodiment.

A harmonic-generating Q switch laser device of intra cavity system according to the second embodiment is shown in FIG. 5. As the same as in the first embodiment, the nonlinear optical crystal 26 is positioned differently from the device shown in FIG. 8, and is located between the mirrors 21 and 24. The control signal is shown in FIG. 4.

In FIG. 5, a harmonic dispensing device 51 is an optical modulator such as acousto-optical modulator (AOM). Other components are same as in the extra cavity system shown in FIG. 8 although the order is different.

The nonlinear optical crystal 26 generates a higher harmonics while the incident beam diameter is wide. Therefore, a weak harmonic laser may be issued with an infrared ray (IR) during the first pause period T1 of the laser pulse, that is, a continuous wave (CW) of a fundamental wave laser. In this device installed in the laser processing machine, even if the weak harmonic laser exceeds the processing threshold, the harmonic pulse is dispensed by the harmonic dispensing device 51. The device 51, a control signal for dispensing only harmonic pulse as shown in FIG. 4 is input, and is disposed in the harmonic output path as shown in FIG. 5.

Further, after generation of pulse, a weak harmonic laser may be generated also in a period T3 when the Q switch is turned on. But it is shielded by the harmonic dispensing device 51 and does not come out. As a result, the laser device of the intra cavity system has the same effect as the extra cavity system.

What is claimed is:

1. A laser device for generating a laser pulse train formed of a sequence of laser pulses, comprising:

an output mirror;

a reflector mirror;

a gain medium located between said output mirror and reflector mirror for accumulating a laser gain;

a Q switch means located between said output mirror and reflector mirror, for turning on and off a laser oscillation by said output mirror, reflector mirror, and gain medium, said Q switch means for turning on laser oscillation during a first pause period before generation of the laser pulse train, and for turning off the laser oscillation during a second pause period before generation of the laser pulse train; and a nonlinear optical crystal irradiated with a fundamental wave laser light by the laser oscillation for generating a harmonic laser light.

2. The laser device of claim 1, wherein said nonlinear optical crystal is located between said output mirror and reflector mirror.

3. The laser device of claim 1, further comprising a harmonic dispensing device for dispensing harmonic laser pulses located in an output path of the laser pulse.

4. The laser device of claim 3, wherein said harmonic dispensing device is an optical modulator.

5. The laser device of claim 1, wherein said output mirror is located between said reflector mirror and said nonlinear optical crystal.

6. The laser device of claim 1, wherein the second pause period is equal to a period of the laser pulse train minus a width of each of the laser pulses.

7. The laser device of claim 1, wherein the second pause period is less than a period of the laser pulse train minus a width of each of laser pulses.

8. The laser device of claim 7, wherein a power of the laser pulse is controlled by the second pause period.

9. The laser device of claim 1, further comprising a filter for separating the harmonic laser light generated by said nonlinear optical crystal and the fundamental wave laser light.

10. The laser device of claim 1, wherein said gain medium oscillates laser light continuously.

11. The laser device of claim 1, further comprising means for irradiating said gain medium with excitation light having an identical power during the first and second pause periods.

12. A method of controlling a laser device having an output mirror, a reflector mirror, and a gain medium located between said output mirror and reflector mirror for accumulating laser gain, for generating a laser pulse train including a first laser pulse at a beginning thereof and a second laser pulse next to the first laser pulse by a laser oscillation by said output mirror, reflector mirror and gain medium, said method comprising:

turning on the laser oscillation during a first pause period before a generation of the first laser pulse, wherein the lager light continuously oscillates during the first pause period; turning off the laser oscillation during a second pause period before a generation of the first laser pulse; and turning off the laser oscillation during a period identical to the second pause period before generation of the second laser pulse and after the generation of the first laser pulse, wherein an interval between the first and second laser pulses is shorter than a sum of the first and second pause periods.

13. The method of claim 12, further comprising dispensing only the laser pulse.

14. The method of claim 13, wherein said dispensing only the laser pulse comprises dispensing only the laser pulse by an optical modulator.

15. The method of claim 12, wherein the second pause period is equal to a period of the laser pulse train minus a width of each of the laser pulses.

16. The method of claim 12, wherein the second pause period is less than a period of the laser pulse train minus a width of each of the laser pulses.

17. The method of claim 16, wherein a power of the laser pulse is controlled according to the second pause period.

18. The method of claim 12, further comprising generating harmonic laser light from a fundamental wave laser light by the laser oscillation.

19. The method of claim 18, further comprising separating the harmonic laser light and the fundamental wave laser light.

20. The method of claim 12, further comprising:

irradiating the gain medium with excitation light having an identical power during the first and second pause periods.

21. A laser processing machine for processing an article including a laser device for generating a laser pulse train formed of a sequence of laser pulses, said laser device comprising:

an output mirror;

a reflector mirror;

a gain medium located between said output mirror and reflector mirror for accumulating a laser gain;

Q switch means located between said output mirror and reflector mirror, for turning on and off the laser oscillation by said output mirror, reflector mirror and gain medium, said Q switch means for turning on laser oscillation during a first pause period before generation of the laser pulse train, and for turning off the laser oscillation during the second pause period before generation of the laser pulse train; and a nonlinear optical crystal irradiated with a fundamental wave laser light by the laser oscillation for generating a harmonic laser light.

22. The laser processing machine of claim 21, wherein said nonlinear optical crystal is located between said output mirror and reflector mirror.

23. The laser processing machine of claim 21, further comprising a harmonic dispensing device for dispensing harmonic laser pulses located in an output path of the laser pulse.

24. The laser processing machine of claim 23, wherein said harmonic dispensing device comprises an optical modulator.

25. The laser processing machine of claim 21, wherein said output mirror is located between said reflector mirror and said nonlinear optical crystal.

26. The laser processing machine of claim 21, wherein the second pause period is equal to a period of the laser pulse train minus a width of each of the laser pulses.

27. The laser processing machine of claim 21, wherein the second pause period is less than a period of the laser pulse train minus a width of each of the laser pulses.

28. The laser processing machine of claim 27, wherein a power of the laser pulse is controlled with the second pause period.

29. The laser processing machine of claim 21, further comprising a filter for separating harmonic laser light generated by the nonlinear optical crystal and the fundamental wave laser light.

30. The laser processing machine of claim 21, wherein the article is a printed circuit board.

31. The laser processing machine of claim 21, wherein said gain medium continuously oscillates laser light.

32. The laser processing machine of claim 18, further comprising means for irradiating said gain medium with excitation light having an identical power during the first and second pause periods.

33. A method of processing an article using a laser processing machine including a laser device having an output mirror, a ref lector mirror, and a gain medium located between said output mirror and reflector mirror for accumulating a laser gain, for generating a laser pulse train including a first laser pulse at a beginning thereof and a second laser pulse next to the first laser pulse by a laser oscillation by said output mirror, reflector mirror and gain medium, said method comprising:

turning on the laser oscillation during a first pause period before a generation of the first laser pulse, wherein the laser light continuously oscillates during the first pause period;

turning off the laser oscillation during a second pause period before a generation of the first laser pulse; and turning off the laser oscillation during a period identical to the second pause period before generation of the second laser pulse and after the generation of the first laser period, wherein an interval between the first and second laser pulses is shorter than a sum of the first and second pause periods.

34. The method of claim 33, further comprising dispensing only the laser pulse.

35. The method of claim 34, wherein said dispensing only the laser pulse comprises dispensing only the laser pulse by an optical modulator.

36. The method of claim 33, wherein the second pause period is equal to a period of the laser pulse train minus a width of each of the laser pulses.

37. The method of claim 33, wherein the second pause period is less than a period of the laser pulse train minus a width of each of the laser pulses.

38. The method of claim 37, wherein a power of the laser pulse is controlled with the second pause period.

39. The method of claim 33, further comprising generating a harmonic laser light from a fundamental wave laser light by the laser oscillation.

40. The method of claim 39, further comprising separating the harmonic laser light and the fundamental wave laser light.

41. The method of claim 33, wherein the article is a printed circuit board.

42. The method of claim 33, further comprising:

irradiating the gain medium with excitation light having an identical power during the first and second pause periods.

* * * * *